Nov. 2, 1965    N. GORBAR    3,215,395
REGULATING CLAMP FOR FLEXIBLE TUBES
Filed June 25, 1962

INVENTOR
NETTIE GORBAR
BY Larson and Taylor
ATTORNEYS

United States Patent Office 3,215,395
Patented Nov. 2, 1965

3,215,395
REGULATING CLAMP FOR FLEXIBLE TUBES
Nettie Gorbar, 10396 Valley Forge Drive, Apt. B110,
Parma Heights, Ohio
Filed June 25, 1962, Ser. No. 204,944
8 Claims. (Cl. 251—6)

My invention relates to a clamping device adapted to be used on a flexible tubing for the purpose of controlling the flow of fluid through such tubing.

When viewed in a more specific sense my invention relates to a tube clamp for regulating the flow of fluid through flexible tubes and which provides for a plurality of distinct calibrated flow rates through the tube.

Still further my invention relates to a regulating clamp for flexible tubes which minimizes the danger of the clamp slipping and unintentionally changing the rate of flow through the tube.

Accordingly, it is an object of this invention to provide a regulating clamp for flexible tubes which is characterized by its high degree of utility and its ease of manipulation.

It is a further object of this invention to provide a tube clamp for regulating the flow of fluid through flexible tubes which will provide a plurality of distinct calibrated flow rates through the tube, which flow rates are determined by the position of a compressing roller having a number of flat surfaces on its periphery which are of predetermined dimensions and number.

It is a further object of this invention to provide a tube clamp for regulating the flow of fluid through flexible tubes which minimizes the danger of an accidental change in the rate of flow through the tube which could be caused by slippage of the tube clamp.

It is yet another object of this invention to provide a tube clamp of the indicated character which will be simple, inexpensive and efficient, whereby the advantages hereinafter fully set forth may be had.

In the drawings—

Figure 1:
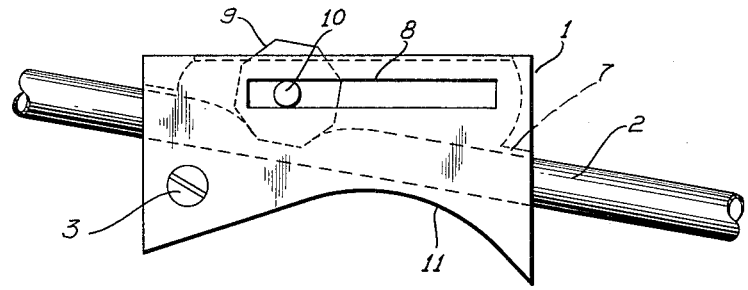
FIGURE 1 is an elevation view showing the device mounted on a flexible tube.
Figure 2:
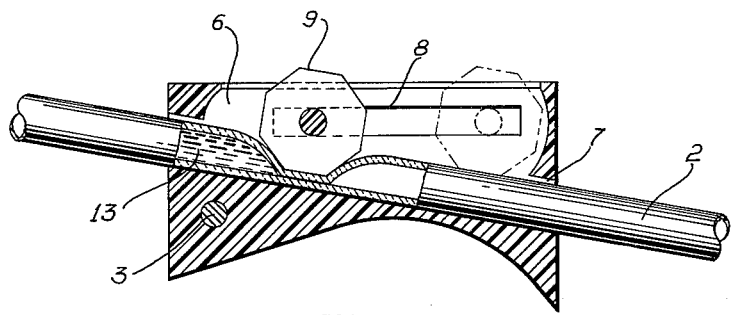
FIGURE 2 is an elevational view similar to FIGURE 1, but partly in section, illustrating the alternate positions of the roller member.
Figures 3, 4:
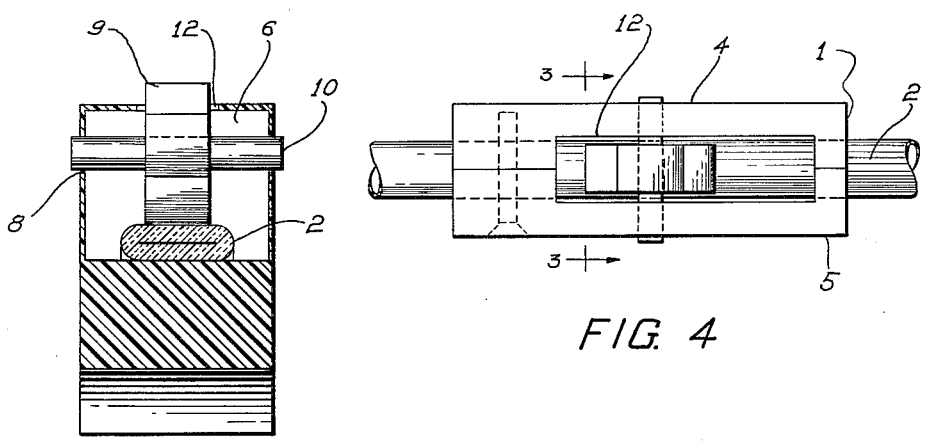
FIGURE 3 is a section view taken on lines 3—3 as shown in FIGURE 4.
FIGURE 4 is a plan view of the device shown in FIGURE 1.

In the embodiment of the invention shown in the drawings the body 1 of the device preferably is constructed of plastic or some like inexpensive and light material. The body 1 has a passage 7 extending throughout its length for receiving a flexible tube 2 in which it is desired to regulate the flow of a fluid 13. The body 1 is conveniently comprised of two separable side pieces 4 and 5 which are joined together by any convenient latching means, such as the screw 3 shown in the drawings. Preferably the latching means should be of any well known easily releasable type so as to facilitate removal or insertion of the device when it would not be convenient to thread a free end of the tube through the passage 7. The body 1 includes a cavity 6 shown most clearly in FIGURES 2 and 3, and this cavity intersects passage 7, as shown in FIGURES 1 and 2. Each of the side pieces 4 and 5 contain slots 8 which extend along the length of the side pieces for a substantial distance. The longitudinal axes of the passage 7 and slots 8, respectively, are arranged at a slight angle which is determined by the particular use to which the device is to be put.

A roller 9 having stub shafts 10 is arranged in cavity 6 so as to be rollable as its stub shafts move in slots 8 from one end of the slots to the other. The roller 9 has a plurality of flat surfaces on its periphery. The roller shown in the drawings is octagonal for purposes of illustration only, and it will be obvious that any desired number of flat surfaces could be arranged in any number of ways so as to meet the operational requirements of a particular application. The roller 9 is shown in the drawings as projecting upwardly from the cavity 6 through a longitudinal opening 12 in the body 1. This permits the roller to be manipulated either by the projecting portion of the roller or by the projecting ends of the stub shafts 10. However, it will be obvious that the roller 9 could be manipulated in any number of ways, and the illustrated manner is intended only to show what has been found to be a highly convenient manner. The side of the body 1 opposite from the longitudinal opening 12 is curved as shown at 11 so as to facilitate manipulation of the device by one hand. For instance, as shown in FIGURE 1, the device could be manipulated by grasping it from the right side, placing the third finger in the curved portion 11, and moving the roller 9 either by grasping the protruding ends of the stub shaft 10 by the thumb and forefinger or by extending the forefinger over the upper surface of the device as shown in FIGURE 1 to move the roller 9 in the cavity 6.

In the operation of the device the body 1 can be placed upon a tube 2 either by threading a free end of the tube through the passage 7 or by disengaging the two side pieces 4 and 5, placing them over a tube 2, and engaging the latching device, such as the screw 3. The roller 9 is initially positioned in the right-hand portion of the cavity as shown in broken lines in FIGURE 2. It will be noted that in this position one of the flat peripheral surfaces of the roller is in slight contact with the surface of the tube 2, but this contact normally will not be sufficient to exert any substantial amount of compressive force on the tube. From this position the roller can be moved by rolling it along the surface of the tube 2, and because of the plurality of distinct flat peripheral surfaces a corresponding number of distinct calibrated flow rates can be obtained, ranging from full flow at the initial position to complete flow stoppage at the final position, that is, the left-hand position shown in FIGURE 2. This advantage could not be obtained with a circular roller since the flow rates would not be distinct. The roller 9 can be moved back and forth to any desired position, and the rate of flow established at any particular position, as determined by the particular flat surface which is then compressing the rubber tube, will be substantially constant regardless of the number of times the roller has been manipulated back and forth. Once the roller has been moved into a particular position where a flat surface is then compressing the tube the invention minimizes any danger of the flow rate being accidentally changed, for instance, by jarring or upsetting the device. The tube surface because of its resiliency presses against the particular flat surface, and this forces tends to hold the roller in the particular position. The absence of this feature has been a pronounced deficiency in prior art devices which use circular rollers.

It will be understood that the embodiment shown in the drawings is illustrative only, and the advantages of the device could still be achieved by a number of variations. For instance, it has been mentioned that the two side pieces 4 and 5 could be joined by any of several known easily releasable latches. Also the device could be arranged so as to permit insertion of the tube from the top or bottom of the device as shown in FIGURES 1 and 2. It is not necessary that the slot 8 extend completely through the side walls, since they could conveniently be formed as grooves on the inner surfaces of the side walls. Nor is it necessary that the longitudinal openings 12 be provided, since the roller could be manipulated in several other ways, for instance, by a member inserted through one of the end walls shown in FIGURES 1 and 2. It should be noted, however, that if the roller is made visible it is then possible to provide markings on the roller which would correspond to the various surfaces and which would provide a ready indication of the particular flow rate for which the device is then set. Furthermore, it is not required that the flat surfaces on the periphery of the roller be uniform either in spacing of dimension, since the flat surfaces on the roller could be so arranged as to give a nonuniform programming effect by one complete movement of the roller from its opposite ends. Finally it should be noted that, although it is desirable, it is not necessary that the roller exert sufficient pressure on the tube when in the extreme open flow position to hold the device steady on the tube since the passage 7 can be arranged to maintain the device steady on the tube.

It is to be understood that the form of my invention, herewith shown and described, is to be taken as a preferred example of the same, and that various changes in the shape, size and arrangement of parts may be resorted to without departing from the spirit of my invention or the scope of the subjoined claims.

I claim:

1. A clamping device for regulating the flow of fluid through a flexible tube comprising a body member for receiving and supporting a flexible tube; a roller having a plurality of flat surfaces on its periphery; means supporting said roller for rolling movement from an initial position in which a first one of said flat surfaces exerts substantially no compressive force on an inserted tube, through a series of intermediate positions in which successive ones of said flat surfaces exert successively increasing compressive force on an inserted tube, to a final position in which a successive one of said flat surfaces exerts a maximum compressive force on said flexible tube, each of said positions corresponding to a distinct flow rate through an inserted tube.

2. A device as recited in claim 1 wherein said means supporting said roller extends substantially in the direction of, but at an angle to, the portion of the body member which supports an inserted tube, the resistive force of said tube against said roller serving to anchor said roller in a selected position.

3. A flexible tube clamping device comprising a body portion having opposed interconnected sides separated by a cavity space, a passageway extending through said body portion and intersecting said cavity over a substantial length of said passageway, each of said sides having a slot therethrough, said slots being parallel and extending in a direction at an angle to the direction of said passageway, a roller having axially aligned trunnions and a plurality of flat surfaces on its periphery, said trunnions being received respectively in said slots so that said roller may be moved in said cavity to roll along the tube to establish a plurality of distinct flow rates when successive ones of said flat surfaces collapse a tube inserted in said passageway.

4. A flexible tube clamping device comprising a body portion, said body portion having a cavity therein, passageways extending from opposed sides of said cavity and terminating in openings in opposed outer surfaces of said body portion for receiving a flexible tube, opposed parallel slots extending from said cavity to second opposed surfaces, said parallel slots extending substantially in the direction of said passageways but at an angle thereto, and a rotatable clamping member mounted on stub shafts which extend through said parallel slots, said clamping member comprising a roller having a plurality of flat surfaces for establishing a plurality of distinct flow rates through an inserted tube when said roller is moved in said cavity to roll upon and compress or release the inserted tube, said flat surfaces further acting to anchor said roller in any of several positions along said slots.

5. A flexible tube clamping device for establishing a plurality of graduated flow rates comprising a body member, said body member having a passage therethrough adapted to receive a flexible tube, said body member having a cavity therein intersecting said passage on one of its sides and over a substantial portion of its length, a roller having a plurality of flat surfaces on its periphery and having axially aligned stub shafts, means in said body for movably supporting said roller in said cavity for rolling movement at an angle to said passage from an initial point at which said roller exerts substantially no compressive force on an inserted tube to an ultimate point at which said roller effects maximum compression on an inserted tube, said flat surfaces of said roller establishing a plurality of distinct flow rates by compressing the inserted tube as the roller is moved from said initial position to said ultimate position.

6. A device as recited in claim 5 wherein when said roller is in said initial position one of said flat surfaces is in contact with a surface of an inserted tube so as to permit movement from said initial point toward said ultimate point only by rolling.

7. A clamping device for regulating the flow of fluid through a flexible tube, comprising: a body member for receiving a flexible tube; means carried by said body member in such a manner as to effect longitudinal rolling movement thereof relative to the surface of an inserted tube and to establish a plurality of flow rates through the inserted tube by reason of successive surface portions of said roller member bearing against the surface of the tube, said means comprising a roller member having a plurality of flat surfaces on its periphery.

8. A clamping device as set forth in claim 7 wherein said body member has longitudinal slot means therein inclined at least in part to the direction of an inserted tube, and said roller member has means for riding in said slot means while said roller member rolls along the inserted tube.

References Cited by the Examiner

UNITED STATES PATENTS

| 1,248,732 | 12/17 | Shave | 24—244 |
| 1,330,523 | 2/20 | Evitts | 251—6 |
| 1,959,074 | 5/34 | Bloxsom | 251—6 |
| 2,437,729 | 3/48 | Easter | 24—194 |
| 2,595,511 | 5/52 | Butler | 251—6 |

FOREIGN PATENTS

| 607,508 | 1934 | Germany. |
| 12,165 | 1891 | Great Britain. |

ISADOR WEIL, *Primary Examiner.*